US009282003B2

(12) United States Patent
Linne et al.

(10) Patent No.: US 9,282,003 B2
(45) Date of Patent: Mar. 8, 2016

(54) METHOD FOR CONFIGURING AN ARRANGEMENT HAVING A COMPUTER SYSTEM AND A TELEPHONE INSTALLATION AND ARRANGEMENT HAVING A COMPUTER SYSTEM AND A TELEPHONE INSTALLATION

(75) Inventors: Johannes Linne, Todtenweis (DE); Maximilian Pfander, Bobingen (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 231 days.

(21) Appl. No.: 13/879,854

(22) PCT Filed: Oct. 19, 2011

(86) PCT No.: PCT/EP2011/068270
§ 371 (c)(1),
(2), (4) Date: Jun. 19, 2013

(87) PCT Pub. No.: WO2012/052483
PCT Pub. Date: Apr. 26, 2012

(65) Prior Publication Data
US 2013/0262639 A1    Oct. 3, 2013

(30) Foreign Application Priority Data
Oct. 21, 2010    (DE) .......................... 10 2010 049 188

(51) Int. Cl.
*H04L 12/24*    (2006.01)
*H04M 1/247*    (2006.01)

(52) U.S. Cl.
CPC ......... *H04L 41/0813* (2013.01); *H04M 1/2472* (2013.01); *H04M 1/2473* (2013.01)

(58) Field of Classification Search
CPC ............ H04L 41/0813; H04M 1/2472; H04M 1/2473

USPC ......................................................... 709/221
See application file for complete search history.

(56) References Cited

U.S. PATENT DOCUMENTS

| 6,041,114 | A | 3/2000 | Chestnut |
| 6,208,874 | B1 * | 3/2001 | Rudisill ................ H01Q 1/084 |
| | | | 455/575.4 |

(Continued)

FOREIGN PATENT DOCUMENTS

| DE | 198 13 463 A1 | 11/1998 |
| DE | 102 05 352 A1 | 8/2003 |

(Continued)

OTHER PUBLICATIONS

Notice of Reasons for Rejection dated Jun. 16, 2015 of corresponding Japanese Application No. 2013-534313 along with its English translation.

*Primary Examiner* — Jude Jean Gilles
(74) *Attorney, Agent, or Firm* — DLA Piper LLP (US)

(57) ABSTRACT

A method of configuring an arrangement has a computer system and a telephone installation, wherein the computer system connects to the telephone installation via a data interface and wherein the computer system and the telephone installation can assume at least one first and one second operating state, including generating control data with a control unit in the computer system depending on a change in operating state of the computer system, from the first operating state into the second operating state, exchanging the control data between the computer system and the telephone installation via the data interface, setting up one or more parameters for the second operating state of the telephone installation with a configuration unit in the telephone installation depending on the control data exchanged, and changing the operating state of the telephone installation from the first operating state into the configured second operating state set up.

20 Claims, 3 Drawing Sheets

(56) References Cited

U.S. PATENT DOCUMENTS

| | | | | |
|---|---|---|---|---|
| 6,292,674 | B1* | 9/2001 | Davis | H04M 1/0281 |
| | | | | 455/550.1 |
| 6,611,580 | B1* | 8/2003 | Dahan et al. | 379/93.29 |
| 7,688,952 | B2* | 3/2010 | Light et al. | 379/42 |
| 7,711,355 | B1* | 5/2010 | Kruger | H04M 1/6075 |
| | | | | 340/441 |
| 8,488,079 | B2* | 7/2013 | Kodama | G02B 5/0221 |
| | | | | 349/64 |
| 8,560,089 | B2* | 10/2013 | Yang | H04N 1/00204 |
| | | | | 700/17 |
| 2006/0034433 | A1 | 2/2006 | Landsperger | |
| 2007/0124427 | A1* | 5/2007 | Light et al. | 709/218 |
| 2008/0144793 | A1 | 6/2008 | King | |
| 2008/0175358 | A1 | 7/2008 | Huang | |
| 2009/0238172 | A1 | 9/2009 | Tanizawa et al. | |
| 2009/0280789 | A1* | 11/2009 | Takuno | H04L 29/1216 |
| | | | | 455/418 |

FOREIGN PATENT DOCUMENTS

| | | |
|---|---|---|
| DE | 10 2004 037 861 B3 | 2/2006 |
| JP | 8-256216 | 10/1996 |
| JP | 2003-259406 | 9/2003 |
| JP | 2004-032086 | 1/2004 |
| JP | 2008-092181 | 4/2008 |
| JP | 2008-271216 | 11/2008 |
| JP | 2008-278085 | 11/2008 |
| JP | 2009-232045 | 10/2009 |

* cited by examiner

METHOD FOR CONFIGURING AN ARRANGEMENT HAVING A COMPUTER SYSTEM AND A TELEPHONE INSTALLATION AND ARRANGEMENT HAVING A COMPUTER SYSTEM AND A TELEPHONE INSTALLATION

TECHNICAL FIELD

This disclosure relates to methods of configuring an arrangement having a computer system and a telephone installation, wherein the computer system connects to the telephone installation via a data interface and wherein the computer system and the telephone installation can assume in each case at least one first and one second operating state.

Furthermore, the disclosure relates to an arrangement having a computer system and a telephone installation, wherein the computer system connects to the telephone installation via a data interface.

BACKGROUND

Computer systems and telephone installations, especially workstation computers and telephone sets, are managed separately from one another. The workstation computer is configured, for example, with different user accounts or can be or is connected as a client system to a host system, wherein different user accounts are stored on the host system. The workstation computer can be configured such that a particular appearance of the display, the so called "desktop," or a predetermined access to application programs or software is predetermined for each user account. Furthermore, it can be adjusted that access to a user account only occurs by inputting valid user data (log-in information with user name and password). Furthermore, operating states and an energy management, for example, a standby state after a predetermined time according to the ACPI standard (ACPI=Advanced Configuration and Power Interface) can be predetermined.

A telephone, especially a telephone set of a telephone installation, can be configured, for example, in that certain short code-dialing keys are occupied with predetermined directory numbers, a particular ringing tone is selected and its loudness and the receiver loudness at the telephone set are adjusted. Furthermore, call forwarding, programming of extensions and an automatic answering machine function or a list of directory numbers of received calls can be configured.

The term "computer system" comprises all types of a computer, for example, a desktop PC, thin client, server or host-client systems. The term "telephone installation" comprises telephones, telephone sets comprising a telephone management system and Internet telephony-capable telephones (so-called voice over IP telephones). Computer systems and telephone installations describe separate electronic installations arranged in separate housings.

At a workstation, at home or in an office environment, there is in most cases also a telephone set in addition to the workstation computer. In the case of changing workstations or when leaving the workstation, workstation computers and telephone sets act independently of one another. In particular in the case of a change of the workstation from a first workstation to a second workstation, a call diversion from a telephone set at the first workstation to another telephone set at the second workstation is also necessary, for example, apart from the registration and deregistration of user accounts of different workstation computers. In addition, only a "foreign" telephone is available at the second workstation. This means that the telephone at the second workstation may not be configured in accordance with the requirements and settings of the new user. Thus, the user must switch off settings on the normal telephone set every time there is a change of workstation and set the telephone at the new workstation as desired. Parameters which are set are, for example, above-mentioned settings at the telephone set.

In the present IT systems, a change of workstation is therefore uncomfortable and time consuming.

There is, therefore, a need to simplify the management of a computer system and of a telephone installation of the type initially mentioned, and especially a change of workstation of a user of these two devices.

SUMMARY

We provide a method of configuring an arrangement having a computer system and a telephone installation, wherein the computer system connects to the telephone installation via a data interface and wherein the computer system and the telephone installation can assume at least one first and one second operating state, including generating control data with a control unit in the computer system depending on a change in operating state of the computer system from the first operating state into the second operating state, exchanging the control data between the computer system and the telephone installation via the data interface, setting up one or more parameters for the second operating state of the telephone installation with a configuration unit in the telephone installation depending on the control data exchanged, and changing the operating state of the telephone installation from the first operating state into the second operating state set up.

We also provide a method of configuring an arrangement having a computer system and a telephone installation, wherein the computer system connects to the telephone installation via a data interface and wherein the computer system and the telephone installation can assume at least one first and one second operating state, including generating control data with a control unit in the telephone installation depending on a change in operating state of the telephone installation from the first operating state into the second operating state, exchanging the control data between the telephone installation and the computer system via the data interface, setting up one or more parameters for the second operating state of the computer system with a configuration unit in the computer system depending on the control data exchanged, and changing the operating state of the computer system from the first operating state into the second operating state set up.

We further provide an arrangement including a computer system, a telephone installation, wherein the computer system connects to the telephone installation via a data interface, a control unit that generates control data depending on a change in operating state of the arrangement, and a configuration unit that sets up one or more parameters depending on the control data, wherein the configuration unit is driven by the control unit, wherein the control unit is arranged in the computer system and the configuration unit is arranged in the telephone installation or the control unit is arranged in the telephone installation and the configuration unit is arranged in the computer system.

LIST OF REFERENCE DESIGNATIONS

Figure 1:
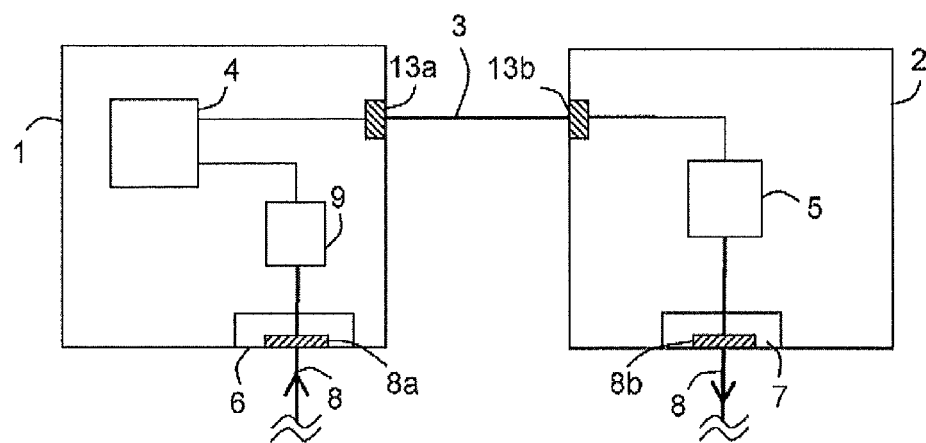
FIG. 1 shows a first example of an arrangement having a computer system and a telephone installation.

1 Computer system
2 Telephone installation
3 Data interface
4 Control unit
5 Configuration unit
6 Input unit
7 Output unit
8 I/O interface
9 Logic unit
10 Host system
11a, 11b, 11c Client system
13a, 13b Interface terminals
18a, 18b Interface terminals
20 Management system
21a, 21b, 21c Telephone set
S1 to S6 Method steps

DETAILED DESCRIPTION

We provide a method of configuring an arrangement having a computer system and a telephone installation of the type mentioned. The method may comprise the steps of generating control data by a control unit in the computer system in dependence on a change in operating state of the computer system from the first operating state into the second operating state, exchanging the control data between the computer system and the telephone installation via the data interface, setting up one or more parameters for the second operating state of the telephone installation by a configuration unit in the telephone installation in dependence on the control data exchanged and changing the operating state of the telephone installation from the first operating state into the second operating state set up.

Such a method enables the telephone installation to be configured which is performed with automated triggering by control data of the computer system and in dependence on the content of the control data. The control data are generated when the computer system changes from the first operating state into the second operating state. Thus, transmitting and setting up personalized settings to the telephone installation allocated to the computer system can be performed by an action in the computer system. The personalized settings can be adopted in the telephone installation wherein the telephone installation changes from the first operating state into the second operating state set up and thus personalized.

This has the advantage that both a change of operating state of the computer system can be associated with an automated change of operating state of the telephone installation and, triggered by the change in operating state of the computer system, personalized settings, generally parameters for a second operating state of the telephone installation, can be transferred to the telephone installation and/or set there.

For example, the change of operating state of the computer system can be triggered by a user who accesses the computer system. This triggers configuration of the telephone installation by transferring special control data to the telephone installation and thus setting up parameters predetermined by the user in the telephone installation. A user can thus manage the devices of a computer system and telephone installation, configured separately from one another, jointly by a single action at the computer system.

We provide a further method of configuring an arrangement having a computer system and a telephone installation of the type mentioned. This method may comprise the steps of generating control data by a control unit in the telephone installation in dependence on a change in operating state of the telephone installation from the first operating state into the second operating state, exchanging the control data between the telephone installation and the computer system via the data interface, setting up one or more parameters for the second operating state of the computer system by a configuration unit in the computer system in dependence on the control data exchanged and changing the operating state of the computer system from the first operating state into the second operating state set up.

A reverse case of the above method is described by such a method. In this method, an automated configuration of the computer system is carried out in dependence on control data conveyed to the computer system by the telephone installation after the telephone installation has changed from the first operating state to the second operating state. By action in the telephone installation, setting up and transferring personalized adjustments to the computer system allocated to the telephone installation is thus triggered and carried out, the computer system subsequently changing from the first operating state to the second operating state set up. The change of operating state of the telephone installation can be triggered by a user action in that, for example, a user inputs a numerical identification at the telephone set to authenticate himself. During this process, the start-up of the computer system in an operating state predetermined by the user or the access to a user account personalized by the user can subsequently be triggered, for example. In this method, too, two devices, computer system and telephone installation, set up separately are thus managed by a single action in the telephone installation.

The two methods explained enable separate electronic devices in a workstation environment to be managed more comfortably. In particular, a change of workstation for a user can thus be made simpler since a user at a new workstation only has to trigger a change of operating state by an action at one of the devices, a configuration and especially a transfer of personalized adjustments to the second device and a change of the second device into the second operating state being automatically triggered.

In both methods mentioned, user data and/or user instructions are preferably read in by an input unit in the computer system or the telephone installation and their validity is checked by a logic unit by stored user data or programmed user instructions in the computer system or the telephone installation. This means that a user acquires access to the computer system or the telephone installation by authenticating himself by certain user data at the device and/or issuing special user instructions, for example, instructions leading to a change in operating state. The data input are subsequently checked for their validity so that a user obtains access to the device only when the user is authorized for this or instructions are executed only if they represent valid and executable instructions. This increases access protection to the devices and their operational safety.

The user data and/or user instructions can comprise any type of personalized access data or command instructions. In the case of the computer system, the user data comprise especially log-in information items protected by a password as a rule. In the case of the telephone installation, the user data comprise, for example, a numerical combination or numerical identification known only to the respective user which corresponds to a so-called PIN access protection (PIN=Personal Identification Number). In the case of modern telephone sets, it is also possible, however, to read certain words or word groups via key inputs, one or more letters of the alphabet being allocated to each key. In the simplest case, it is also possible, however, to trigger a valid user instruction by operating a particular key at the computer system or the telephone installation.

The change in operating state from the first into the second operating state is preferably triggered when the user data and/or user instructions read in have been evaluated as valid by the logic unit. This aspect can relate both to the change in operating state of the computer system and to the change in operating state of the telephone installation in both of the methods mentioned. It is thus not only the access to one of the two devices which requires a user to authenticate himself or issue a valid user instruction. A correct input is also necessary for performing the change in operating state.

This means that control data for the automated configuration of the other device in each case are only generated and transferred to the other device via the data interface if a user has authenticated himself as valid and additionally a change in operating state of the device accessed by the user has been triggered. If user data have been evaluated as invalid, both devices or at least the device to be configured remain in the first operating state so that at least one automated configuration of the device to be configured does not take place. For example, a telephone set remains in an unconfigured first operating state if a registration of a user in the computer system fails. Conversely, a computer system remains, for example, in an operating state with a general registration screen if the access of a user to the telephone set fails.

The control data are generated preferably in dependence on the user data and/or user instructions read in. This means that the control data are generated not only in dependence on a change of operating state of the device accessed by the user. The control data are also dependent on the content of the user data read in. Thus, different control data are generated also for different users who input different user data at the computer system or the telephone installation. User-dependent adjustments for parameters can thus be carried out using individual control data in the device to be configured. By this, the computer system or the telephone installation detects which user wishes to access the device, generates corresponding control data, transfers these to the other device and thus triggers a configuration of the other device personalized for the user.

It is possible that the control data already comprise personalized adjustments transferred to the configuration unit of the device to be configured so that the configuration unit only needs to program these adjustments. However, it is also possible that the control data only comprise command instructions only interpreted in the configuration unit of the device to be configured and from which certain adjustments in the configuration unit are generated which result in a corresponding programming of the device to be configured. Both alternatives are possible but depend on the structure of the computer system and of the telephone installation with special logic units and data interfaces.

Preferably, the parameters for the second operating state of the telephone installation comprise at least one of the following parameters: energy consumption, ringing tone, loudness, allocation of predetermined directory numbers to short code-dialing keys, call forwarding, automatic answering machine function and call list. These are typical parameters of a telephone installation which a user would like to adapt individually. In a method of the first type mentioned, such set parameters can be adopted in a new telephone installation if a user, for example, triggers an access to a user account in a computer system so that the computer system configures the telephone installation. A user can thus change workstations comfortably and access a workstation computer at the new workstation, all settings of the user at the normal telephone installation of the old workstation being adopted automatically in the telephone installation at the new workstation. There is no time consuming resetting-up of the telephone installation at the new workstation.

Preferably, parameters for the second operating state of the computer system comprise at least one of the following parameters: energy consumption, access rights to stored data, access rights to data interfaces, execution of application programs, appearance of a display in a display unit of the computer system and audio output of an audio output unit of the computer system. Especially in methods of the second type mentioned, a user can adopt personal settings by access to a telephone installation in the associated computer system. Thus, the computer system is started up, for example, by access to the telephone installation and a corresponding personalized user account in the computer system is opened. There is no long-winded setting of user inputs and separate registration in the computer system.

Preferably, in both methods, device information and/or information about the installation site of the computer system and the telephone installation is exchanged between the computer system and the telephone installation via the data interface. The information mentioned can be contained in the control data or transferred separately.

In this context, it is possible to store device information of a telephone installation in the computer system and/or device information of the computer system in a telephone installation, for example, an identification number of the telephone installation in the computer system and a MAC address (MAC=Media Access Control) or any other identification number of the computer system in the telephone installation. Every computer system thus knows with which telephone installation it has to exchange control data and conversely, every telephone installation knows with which computer system it has to exchange control data.

However, it is also possible that information about the installation site of the computer system and of the telephone installation, for example, an electronically stored workstation number or room number are stored in a computer system and an associated telephone installation. This, too, ensures a correlation of a computer system with a telephone installation.

These measures are required so that two separate devices, a computer system and a telephone installation, can be correlated with one another and can exchange electrical information in the form of control data. It is especially in networks in which the computer system comprises, for example, one or more servers as a host system and one or more workstation computers as a client system and the telephone installation comprises one or more management systems and one or more telephone sets, that it is necessary to link a workstation computer with a corresponding telephone set via the information. If a user registers, for example, in a workstation computer A, a device identification A is generated and transferred to a server. In the server, an allocation list, for example, is stored in which the server looks for the device identification A and determines a linkage with a telephone set B. Control data to configure the telephone set B are finally transferred from the server to a management system of the telephone installation which forwards the control data to the telephone set B. However, it is also possible that such an allocation table to correlate a device identification A with the telephone set B is stored in the management system of the telephone installation. In this case, the server of the computer system transfers the device identification A to the management system of the telephone installation which in turn determines the correlation of the workstation computer A with the corresponding telephone set B.

We provide an arrangement having a computer system and a telephone installation, wherein the computer system may connect to the telephone installation via a data interface. The arrangement may comprise a control unit that generates control data in dependence on a change in operating state of the arrangement, a configuration unit that sets up one or more parameters in dependence on the control data, wherein the configuration unit is driven by the control unit, and wherein the control unit is arranged in the computer system and the configuration unit is arranged in the telephone installation or the control unit is arranged in the telephone installation and the configuration unit is arranged in the computer system.

Such an arrangement enables one of the devices of the computer system and telephone installation to be configured in dependence on control data of a control unit arranged in the other one of the devices of the computer system and telephone installation. Generating control data is triggered by a change in operating state, preferably of the device in which the control unit is located. After the device in which the configuration unit is located has been configured, this device too can carry out a change in operating state with parameters set up. The arrangement allows both the computer system and the telephone installation to be managed by control data triggered and generated by an action in a single one of the devices. Thus, a user only needs to access one of the devices to be able to manage both devices in parallel. In particular, one or both of the methods mentioned and explained is carried out advantageously by such an arrangement.

Preferably, the computer system comprises at least one host system and a client system managed by the host system. The telephone installation preferably comprises at least one management system and at least one telephone set managed by the management system.

In the text which follows, the subject matter is explained in greater detail with reference to a number of examples in the drawings.

FIG. 1 shows a first example of an arrangement having a computer system 1 and a telephone installation 2. The computer system 1 connects to the telephone installation 2 via a data interface 3, wherein the computer system has an interface terminal 13a and the telephone installation 2 has an interface terminal 13b that connects the two devices via the data interface 3. Via the data interface 3, data can be exchanged bidirectionally between the computer system 1 and the telephone installation 2. However, it is also possible to set up only a unidirectional exchange from the computer system 1 to the telephone installation 2 in this example.

The computer system 1 is, for example, a workstation computer such as a desktop computer or a notebook. The telephone installation is, for example, a conventional telephone set having a receiver or headset, an alphanumeric keypad and function keys with preset functions, and a display.

The computer system 1 exhibits an input unit 6 that reads in data input into the computer system 1 (see arrow). For this purpose, the input unit 6 has an input/output interface, I/O interface 8 in brief, comprising interface terminals 18a. The input unit 6 is, for example, a keyboard, a mouse, a touch-sensitive display, a voice input interface or any other possible man-machine communication interface. In consequence, information and data can be read into the computer system 1 via the input unit 6. These data comprise, for example, user data or user instructions. The data are read in by the logic unit 9 and compared, for example, with stored user data or programmed user instructions. A positive comparison means that the data input are valid.

If the data are valid, the logic unit 9 generates corresponding signals which are forwarded to a control unit 4. The control unit 4 interprets the signals and generates control data in dependence on the user data or user instructions read in. These control data are also different for different user data or user instructions. However, the control data can also exhibit an at least partially identical information content in dependence on user data or user instructions. The control data are finally provided at interface terminal 13a of the computer system 1.

The data interface 3 is used to transfer the control data from the computer system 1 to the telephone installation 2. The control data are received by the telephone installation 2 via the interface terminal 13b and forwarded to a configuration unit 5. In the configuration unit 5, the control data are interpreted and trigger the setting of parameters so that individual settings in the telephone installation 2 can be performed depending on the user data or user instructions input at the computer system 1. The configuration unit 5 programs certain parameters, for example, the energy consumption, ringing tone, loudness, allocation of predetermined directory numbers to the short code-dialing keys, programming of extensions or call forwarding which may be timed, or an automatic answering machine function.

The parameters set also affect data output (see arrow) at an output unit 7 of the telephone installation 2 with an interface terminal 18b for an I/O interface 8 of the telephone installation 2. The output unit 7 is, for example, a display, a loudspeaker, LED displays or other. The I/O interface 8 of the telephone installation 2 may represent any man-machine communication interface having interface terminals 18b, for example, a receiver, a headset, keys with predetermined function, one or more dialing wheels, a touch-sensitive display, a camera for video telephony, a voice recognition system or the like.

Such an arrangement finally enables a change of operating state of the computer system 1 from a first operating state into a second operating state to be triggered by user inputs or user instructions at the computer system 1, wherein user-dependent control data are generated and forwarded to the telephone installation 2 via the data interface 3. The telephone installation 2 is thereupon configured correspondingly and also changes from a first operating state into the second operating state set. It is possible that settings for parameters of the telephone installation are already defined in the computer system 1 and corresponding control commands are forwarded to the telephone installation 2 via the control data, which only need to be executed in the configuration unit 5 of the telephone installation 2. However, it is also possible that, in the computer system 1, only user-dependent control data are generated which are only processed by the configuration unit 5 of the telephone installation 2 and linked to corresponding settings which are subsequently programmed.

It is only necessary that correlation information between the computer system 1 and the telephone installation 2 is stored in one or both devices 1 and 2 so that a local or device-dependent correlation between the computer system 1 and the telephone installation 2 is provided for. By user action at the computer system 1, both the computer system 1 and the telephone installation 2 can thus be configured and managed. A user does not need to perform any elaborate and time-consuming adjustments at both devices 1 and 2. Especially in the case of a change of workstation, personalized adjustments especially of the telephone installation 2 can be transferred to a new telephone installation 2 by only registering and deregistering a user at the computer system 1.

Figure 2:
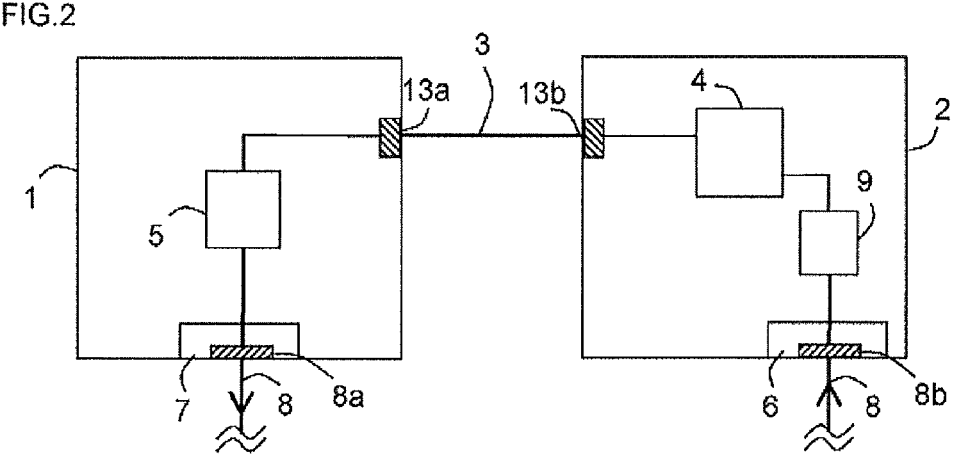
FIG. 2 shows a second example of an arrangement having a computer system and a telephone installation.

FIG. 2 shows a second example of an arrangement having a computer system 1 and a telephone installation 2. However, the difference from the example according to FIG. 1 is that essential components for exchanging control data and configuring a corresponding device are arranged interchanged in the devices 1 and 2 in comparison to the example of FIG. 1. Thus, the telephone installation 2 now has an input unit 6 with a corresponding I/O interface 8 and a logic unit 9 that checks validity of the input data and a control unit 4 that generates control data. These control data are forwarded via interface terminal 13b and the data interface 3 to interface terminal 13a of computer system 1. Computer system 1 has a configuration unit 5 that interprets the control data and sets up corresponding parameters which, among other things, influence an output unit 7 having a corresponding I/O interface 8 and interface terminals 18a.

According to this example, configuration of the computer system 1 can be implemented in automated manner via generated control data in the telephone installation 2. For example, a user can input a particular user instruction or certain user data at the telephone installation 2 via the input unit 6, for example, in the form of a numerical identification, wherein personalized control data are generated in the control unit 4 which specify the setting for a predetermined user account of the user in the computer system 1. Subsequently, the user is registered in an automated manner at the user's account in the computer system 1. Thus, all personalized settings are available to the user in the computer system 1 after an authorization at the telephone installation 2.

Figure 3:
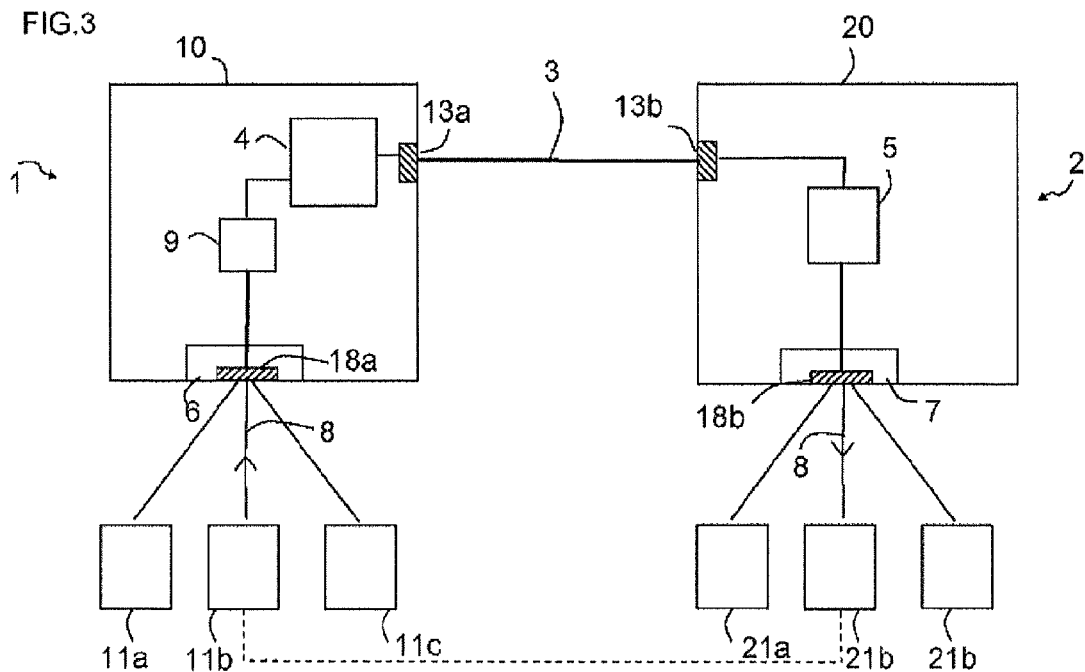
FIG. 3 shows a third example of an arrangement having a computer system and a telephone installation.

FIG. 3 shows a further example of a computer system 1 and a telephone installation 2, wherein the computer system 1 exhibits a host system 10 having all components of the computer system 1 from FIG. 1 and client systems 11a, 11b, 11c connected to the host system 10. Interface terminals 18a of the computer system 1, which are arranged in an input unit 6 at the host system 10, are used to connect the client systems 11a, 11b, 11c to the host system 10. The individual client systems 11a, 11b, 11c can be addressed, controlled and managed via the host system. A network link is set up, for example, via a local area network (LAN).

In this example, the telephone installation 2 has a management system 20 having all components of the telephone installation 2 from FIG. 1, wherein a number of telephone sets 21a, 21b, 21c connect to the management system 20. To connect the telephone sets 21a, 21b, 21c to the management system 20, interface terminals 18b of the telephone installation 2 are arranged in an output unit 7 at the management system 20. The management system 20 conveys calls to individual telephone sets 21a, 21b, 21c and organizes the distribution of extensions and dialing calls. The management system 20 is, for example, a telephone installation of the Hicom or HiPath type by the Siemens company.

One of the client systems 11a, 11b, 11c and one of the telephone sets 21a, 21b, 21c is available at a workstation. For example, the client system 11b and the telephone set 21b are accommodated at a workstation. This local relationship is represented diagrammatically by a dashed connection between the two devices in FIG. 3. If a user logs in at the client system 11b, user data and/or user instructions are read in to the host system 10 via the input unit 6 and converted into control data according to the method explained in FIG. 1, which data are forwarded to the management system 20 of the telephone installation 2 via the data interface 3. The configuration unit 5 of the management system 20 then generates settings for parameters and receives correlation information, that is to say identification information of the client system 11b at which a user has started an action. The configuration unit 5 in the management system 20 and/or the control unit 4 in the host system 10 compare correlation information of the client system 11b with correlation information of all telephone sets 21a, 21b, 21c of the telephone installation 2. The client system 11b is allocated correspondingly to the telephone set 21b, for example, by comparison of the data from a look-up table.

Parameters set can subsequently be forwarded to the telephone set 21b via the configuration unit 5 and the output unit 7. The telephone set 21b is thus programmed in accordance with the settings from the configuration unit 5.

Depending on the example of the arrangement, settings for parameters can be predetermined already in the control unit 4 of the host system 10 and these settings can be forwarded to the configuration unit 5 of the management system 20, the configuration unit 5 only having to program these settings in the telephone set 21b. However, it is also possible that the control unit 4 of the host system 10 only generates information via the client system 11b and this information is processed in the configuration unit 5 of the management system 20, wherein settings for parameters are specified and performed only in the configuration unit 5.

Figure 4:
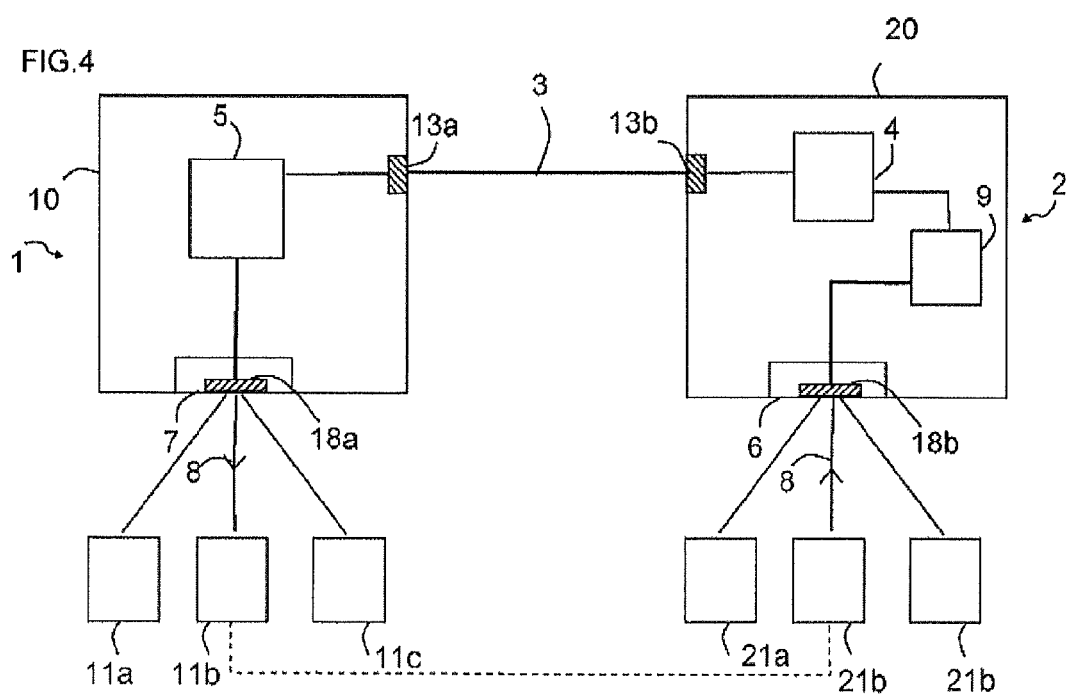
FIG. 4 shows a fourth example of an arrangement having a computer system and a telephone installation.

FIG. 4 shows a further example of an arrangement having a computer system 1 and a telephone installation 2 which, according to FIG. 3, are designed as host/client systems or management systems, respectively, with connected telephone sets, but the host system 10 or the management system 20, respectively, are arranged according to FIG. 2 in their functionality. In this context, the client system 11b and the telephone set 21b must be managed jointly at one location as in FIG. 3. In this context, however, the client system 11b is configured in that control data are generated, and forwarded to the configuration unit 5 of the host system 10, via a logic unit 9 and via a control unit 4 due to a user input at the telephone set 21b. The configuration unit 5 creates settings for parameters in accordance with the aforementioned manner so that the client system 11b can be arranged via personalized settings. Corresponding explanations in this regard can be found in the equivalent explanations from FIG. 2.

It is also possible to generate mixed forms of the examples from FIGS. 1 to 4. Thus, for example, a computer system 1 can be a single workstation computer arranged at a workstation, together with a telephone set of a telephone installation 2 comprising a management system 20 and a number of telephone sets 21a, 21b, 21c. Conversely, it is possible to link a single telephone set with a client system from a group of client systems 11a, 11b, 11c which are managed via a host system 10.

Depending on the design of the devices, a data interface 3 must also be correspondingly adapted. Thus, it is possible, for example, to provide a data interface 3 according to the examples from FIGS. 3 and 4 also between the individual devices 11a, 11b, 11c and 21a, 21b, 21c. In this context, a client system 11a, 11b, 11c is managed via a host system 10, and a telephone set 21a, 21b, 21c via a management system 20, but a data exchange of control data can take place directly between the individual devices 11a, 11b, 11c and 21a, 21b, 21c. It is also possible to provide a data interface 3 between a host system 10 and a telephone set 21a, 21b, 21c or between the management system 20 and a client system 11a, 11b, 11c.

Constructing a telephone installation 2 in accordance with FIGS. 3 and 4 is appropriate, for example, if telephone sets 21a, 21b, 21c are Internet telephony-capable telephones connected to one another via a network link. If, however, the telephone sets 21a, 21b, 21c represent conventional, analog telephone sets, a data link 3 to configure the telephone sets 21a, 21b, 21c can also lead from a host system 10 or a client system 11a, 11b, 11c directly to the telephone sets 21a, 21b, 21c, if the telephone sets 21a, 21b, 21c are not managed via a management system 20, or only in a restricted way. In this context, it may be possible to perform all personalized settings of a telephone set 21a, 21b, 21c in the computer system 1 and transfer these settings to the respective telephone set 21a, 21b, 21c only via the data interface 3.

Figure 5:
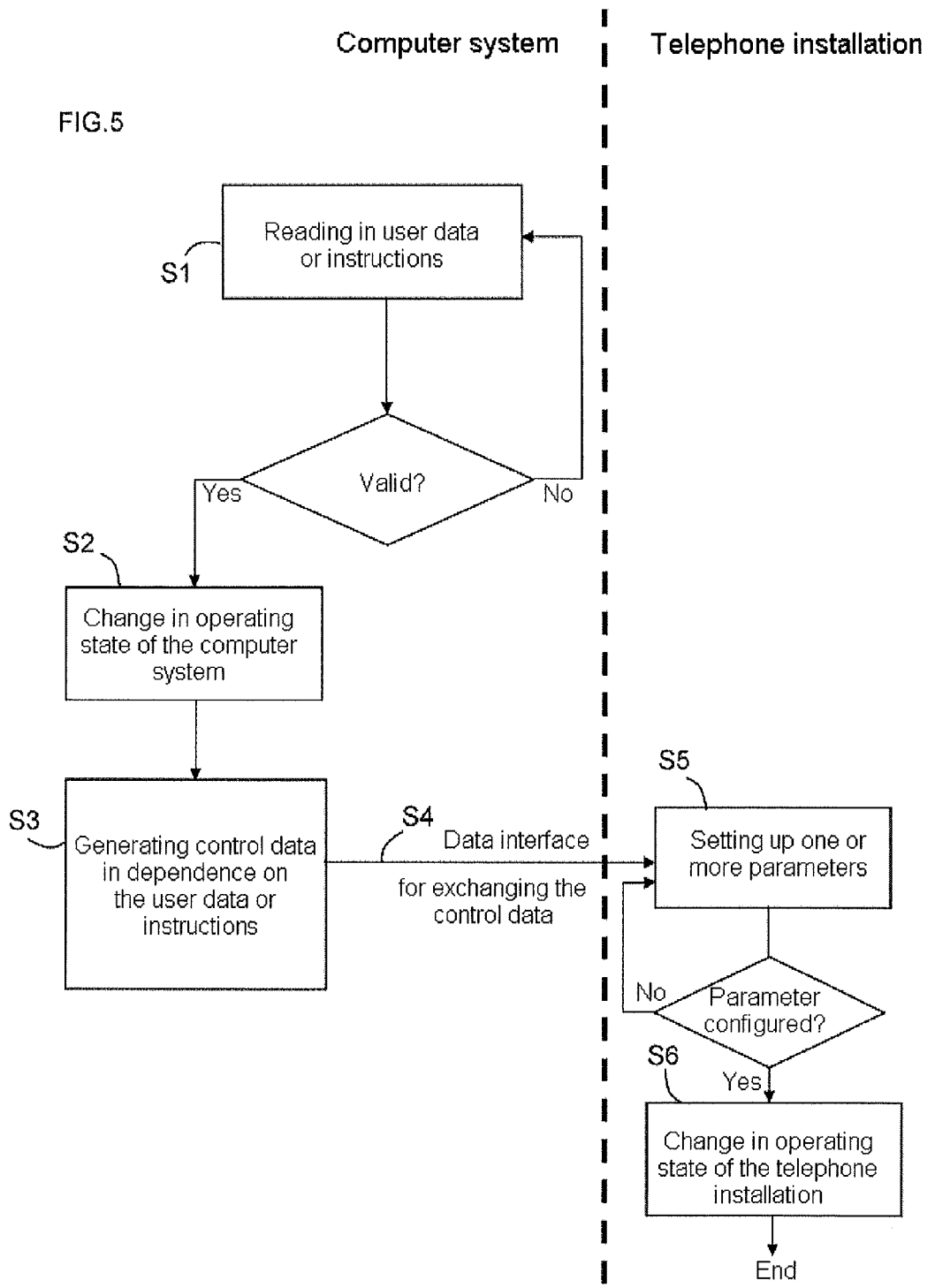
FIG. 5 shows a diagrammatic flow chart of a method of configuring a computer system and a telephone installation.

FIG. 5 shows a diagrammatic flow chart of a method of configuring a computer system 1 and a telephone installation 2. By way of an example, the method shall be specified in which a telephone installation can be configured automated by user inputs at a computer system.

In a first step S1, user data or user instructions are read in which are input by a user in the computer system 1. Furthermore, it is checked whether these user data or user instructions input are valid. If this is not the case, the user returns to step S1 and expects inputs of further or new user data or user instructions. If, however, the data are valid, it is assumed that a user was able to authenticate himself and has access to the computer system. Following this, the process changes to step S2 whereupon a change in operating state of the computer system is carried out, for example, after a successful registration of the user at a user account of the computer system. A change in operating state can describe, for example, starting-up the computer system from a switched-off or a standby state. The reverse case is also possible, however, in which a user has input user instructions to switch the computer system off and shutting it down. A change in operating state is also possible on transition from an operating state with a high energy consumption to an operating state with a lower energy consumption or conversely.

After the change in operating state, control data are generated in dependence on the user data or the user instructions in step S3. The control data contain instructions for a configuration of the telephone installation according to personalized settings of the user who has registered in the computer system in step S1.

In step S4, the control data are forwarded to the telephone installation via the data interface. The control data are interpreted in step S5, for example, via a configuration unit, one or more parameters subsequently being arranged for a configuration of the telephone installation. Furthermore, it is checked whether the parameters are configured completely. If this is not the case, step S5 is continued until all parameters are configured. Subsequently, the telephone installation is possibly programmed with the parameters newly set up in accordance with the personalized settings of a user and a change of operating state of the telephone installation from a first operating state into the second preset operating state is effected according to step S6.

Following this the telephone installation is also in the second operating state, all personalized settings of a user who has logged in at the computer system 1 having been transferred to the telephone installation. A user is thus able, especially in the case of a change of workstation, to also configure the associated telephone installation correspondingly simply and only by actions at the computer system. The method is thus concluded.

In all examples, components 4 and 5 and 9 represent either logic circuits or computer programs. Logic circuits can be, for example, microcontrollers or field programmable gate arrays (FPGAs). Computer programs can represent, for example, program rode in a programming language such as C, C++, Java or the like or assembler code.

The term "change in operating state" relates to all changes in an operating state in a computer system 1 or of a telephone installation 2, wherein, especially in the case of computer system 1, changes of energy saving states in conjunction with access to a particular user account and associated access rights in the computer system are described. In the telephone installation 2, this comprises all changes of energy saving states possibly in conjunction with a setting of particular parameters such as call diversion or answering machine function or muting of the telephone. Thus, for example, a telephone set of a telephone installation 2 can be switched into a current saving mode when the associated computer system 1 is placed into a saving state by a user via corresponding instructions. Conversely, a telephone set of a telephone installation 2 can be woken up when a user logs in at the associated computer system 1. Correspondingly, further adjustments of the aforementioned and explicitly explained type are performed at both devices.

It is also possible to set up both the computer system and the telephone installation such that certain basic functions or emergency functions can also be performed without automated configuration according to the methods of the aforementioned type. It is thus still possible to telephone from a telephone set or that a computer system has a general operating state having basic functions. Therefore, both devices can also be used without configuration and independently of an action at the other device at least in the non-configured type and with restricted basic functions.

The invention claimed is:

1. A method of configuring an arrangement having a computer system and a telephone installation, wherein the computer system connects to the telephone installation via a data interface and wherein the computer system and the telephone installation can assume at least one first and one second operating state, comprising:

generating control data with a control unit in the computer system depending on a change in operating state of the computer system from the first operating state into the second operating state, exchanging the control data between the computer system and the telephone installation via the data interface, setting up one or more parameters for the second operating state of the telephone installation with a configuration unit in the telephone installation depending on the control data exchanged, and changing the operating state of the telephone installation from the first operating state into the second operating state set up.

2. A method of configuring an arrangement having a computer system and a telephone installation, wherein the computer system connects to the telephone installation via a data interface and wherein the computer system and the telephone installation can assume at least one first and one second operating state, comprising:

generating control data with a control unit in the telephone installation depending on a change in operating state of the telephone installation from the first operating state into the second operating state, exchanging the control data between the telephone installation and the computer system via the data interface, setting up one or more parameters for the second operating state of the computer system with a configuration unit in the computer system depending on the control data exchanged, and changing the operating state of the computer system from the first operating state into the second operating state set up.

3. The method according to claim 1, wherein user data and/or user instructions are read in by an input unit in the computer system or the telephone installation and their validity is checked by a logic unit by stored user data or programmed user instructions in the computer system or the telephone installation.

4. The method according to claim 3, wherein the change in operating state from the first into the second operating state is triggered when the user data and/or user instructions read in have been evaluated as valid by the logic unit.

5. The method according to claim 4, wherein the control data are generated depending on the user data and/or user instructions read in.

6. The method according to claim 1, wherein the parameters for the second operating state of the telephone installation comprise at least one of the following parameters:
energy consumption,
ring tone,
loudness,
allocation of predetermined directory numbers to short code-dialing keys,
call forwarding,
automatic answering machine function,
call list.

7. The method according to claim 2, wherein the parameters for the second operating state of the computer system comprise at least one of the following parameters:
energy consumption,
access rights to stored data,
access rights to data interfaces,
execution of application programs,
appearance of a display in a display unit of the computer system,
audio output of an audio output unit of the computer system.

8. The method according to claim 1, wherein device information and/or information about the installation site of the computer system and the telephone installation is exchanged between the computer system and the telephone installation via the data interface.

9. An arrangement comprising:
a computer system,
a telephone installation, wherein the computer system connects to the telephone installation via a data interface,
an input unit that reads in user data,
a logic unit that compares the read in user data with stored user data for validation of the user data,
a control unit that generates control data depending on a change in operating state of the arrangement triggered by the read in user data,
a configuration unit that sets up one or more parameters depending on the control data, wherein the configuration unit is driven by the control unit,
wherein
the input unit, the logic unit, and the control unit are arranged in the computer system and the configuration unit is arranged in the telephone installation or
the input unit, the logic unit, and the control unit are arranged in the telephone installation and the configuration unit is arranged in the computer system.

10. The arrangement according to claim 9, wherein the computer system comprises at least one host system and at least one client system managed by the host system.

11. The arrangement according to claim 9, wherein the telephone installation comprises at least one management system and at least one telephone set managed by the management system.

12. The method according to claim 2, wherein user data and/or user instructions are read in by an input unit in the computer system or the telephone installation and their validity is checked by a logic unit by stored user data or programmed user instructions in the computer system or the telephone installation.

13. The method according to claim 3, wherein the parameters for the second operating state of the telephone installation comprise at least one of the following parameters:
energy consumption,
ring tone,
loudness,
allocation of predetermined directory numbers to short code-dialing keys,
call forwarding,
automatic answering machine function,
call list.

14. The method according to claim 4, wherein the parameters for the second operating state of the telephone installation comprise at least one of the following parameters:
energy consumption,
ring tone,
loudness,
allocation of predetermined directory numbers to short code-dialing keys,
call forwarding,
automatic answering machine function,
call list.

15. The method according to claim 5, wherein the parameters for the second operating state of the telephone installation comprise at least one of the following parameters:
energy consumption,
ring tone,
loudness,
allocation of predetermined directory numbers to short code-dialing keys,
call forwarding,
automatic answering machine function,
call list.

16. The method according to claim 3, wherein the parameters for the second operating state of the computer system comprise at least one of the following parameters:
energy consumption,
access rights to stored data,
access rights to data interfaces,
execution of application programs,
appearance of a display in a display unit of the computer system,
audio output of an audio output unit of the computer system.

17. The method according to claim 4, wherein the parameters for the second operating state of the computer system comprise at least one of the following parameters:
energy consumption,
access rights to stored data,
access rights to data interfaces,
execution of application programs,
appearance of a display in a display unit of the computer system,
audio output of an audio output unit of the computer system.

18. The method according to claim 5, wherein the parameters for the second operating state of the computer system comprise at least one of the following parameters:
- energy consumption,
- access rights to stored data,
- access rights to data interfaces,
- execution of application programs,
- appearance of a display in a display unit of the computer system,
- audio output of an audio output unit of the computer system.

19. The method according to claim 2, wherein device information and/or information about the installation site of the computer system and the telephone installation is exchanged between the computer system and the telephone installation via the data interface.

20. The arrangement according to claim 10, wherein the telephone installation comprises at least one management system and at least one telephone set managed by the management system.

\* \* \* \* \*